United States Patent [19]

Mazalas

[11] 3,831,175

[45] Aug. 20, 1974

[54] MULTICHANNEL REMOTE CONTROL SYSTEM

[75] Inventor: Anthony P. Mazalas, Hartford, Conn.

[73] Assignee: Sound Technology, Inc., Enfield, Conn.

[22] Filed: Dec. 8, 1971

[21] Appl. No.: 206,064

[52] U.S. Cl. .......... 343/228, 179/41 A, 179/84 VF, 340/171 A

[51] Int. Cl. .......... H04b 7/00

[58] Field of Search ...... 343/228; 179/41 A, 84 VF, 179/18 EB

[56] References Cited

UNITED STATES PATENTS

| | | | |
|---|---|---|---|
| 3,436,486 | 4/1969 | Stevens | 179/18 EB |
| 3,534,266 | 10/1970 | Halstead | 343/228 |
| 3,651,407 | 3/1972 | Sarallo | 343/228 |
| 3,657,655 | 4/1972 | Fukata | 343/228 |

*Primary Examiner*—Thomas B. Habecker

[57] ABSTRACT

A multichannel remote control system is presented having a series of crystal oscillator controlled channels of selected different carrier frequencies arranged in a predetermined order in both the transmitter and receiver. Reception of a proper carrier signal at any channel in the receiver serves both to power the next succeeding stage and to arm that next succeeding channel for the delivery of power to still another succeeding channel. A stage or channel of a random frequency is included in the detector to deactivate the detector in the event of the reception of an improper transmission, and a timing circuit is also included to deactivate the receiver in the event the proper sequence of signals is not received within an allotted time.

23 Claims, 3 Drawing Figures

MULTICHANNEL REMOTE CONTROL SYSTEM

BACKGROUND OF THE INVENTION

This invention relates to the field of remote control systems utilizing the transmission and reception of signals of different frequencies for the remote control of a device or mechanism. More particularly, this invention relates to a remote control system wherein successive frequency signals, when received in the proper sequence, result in or cause the successive actuation of channels or stages in a receiver whereby an actuating signal is eventually delivered to the device or mechanism to be operated.

Multichannel remote control systems have been known and used for many years. Known systems of this general type have ranged in complexity from relatively simple systems to extremely complex systems, some of which have even employed relatively sophisticated logic circuitry. The simplier systems are typically of very limited utility or versatility; the more complicated or sophisticated systems typically present problems of difficulty in manufacture and service, are expensive, are of questionable reliability because of their complexity, and are also often of limited utility or flexibility.

Typical problems encountered with these prior art devices include unintentional actuation resulting from cross talk between channels, possible actuation by intentional or unintentional random signaling, power drain resulting from actuation of less than all of the receiver channels whereby a drain is imposed on the power source without being used for actuation of the intended device or instrument, and system inflexibility in that changing of the signal which operates a particular channel in the receiver can not be accomplished easily and economically.

SUMMARY OF THE INVENTION

The present invention is designed to provide a privately controlled transmission of a series of unmodulated carrier signals of different frequencies to close a circuit for the operation of a device by remote control upon the reception of the unmodulated carrier signals in a proper sequence and within a predetermined limited period of time. The present invention is particularly adapted to citizen band transmission and reception in that the invention uses a series of crystal oscillator controlled channels, both in the transmitting unit and the receiving unit, the crystal oscillator controlled channels in each of the transmitter and receiver units being arranged in a predetermined order. When the signals are transmitted in the predetermined order, the reception of each signal in its proper order results in the sequential powering of each succeeding channel and the arming of a conduction control device in the succeeding channel.

Each receiver channel has a mixer, a crystal oscillator and an IF amplifier which together may be a standard citizen band receiver capable of detecting unmodulated carrier signals. Upon receipt of the appropriate carrier signal, the receiver channel generates a voltage output which energizes a conduction control device whereby power is delivered to the next successive channel and the conduction control device in the next successive channel is also armed. This sequence is repeated until all of the channels have been activated in the proper sequence, whereupon the device to be remotely controlled is then activated. The first channel in the receiver is connected to the power source so that it is ready for reception. However, the second and successive stages in the receiver are not initially connected to the power source, but rather, each is connected to the power source in succession only upon activation of the preceding channel. In this way, channel actuation due to cross talk or spurious or other unwanted signals is eliminated.

A random frequency channel is included in the receiver as a safety device to prevent actuation of the remote control device as the result of random, spurious or intentional or unintentional signaling. The frequency of the oscillator in this random channel is arbitrarily selected, so long as it is different from the frequencies of the other channels in the receiver, and this random channel is connected to discontinue delivery of power to the receiver channels upon receipt of a signal of the frequency of this random channel. A timer mechanism is also included in the receiver whereby a power supply is discontinued if the channels are not all activated within a predetermined time period after actuation of the first channel. The random channel and the timer feature both insure against unintentional actuation of the remote control device by spurious or other unintentional signaling. The random channel protects against an attempt to gain unauthorized access to the remote control device through the tactic of transmitting a wide spectrum of successive frequency signals. To a large extent the timer feature also protects against such unauthorized access attempts, and the timer also protects against a power drain which might result in the situation where less than all of the channels were actuated.

In the present invention the number of channels to be used in the transmitter and in the receiver will be determined by the use to which the system is to be applied and can be varied in accordance with the amount of privacy desired or required for the particular application. If the device to be remotely controlled is a casual device such as an amusement device or a toy, just two channels can be employed, two channels being the minimum number for operation of the system. If the device to be remotely controlled is something of the nature of a household or automotive device, such as room light control, garage door control or automobile ignition, a greater degree of privacy, i.e. insurance against unauthorized access, would be desired and three or four channels could be employed. Critical industrial applications could have four to six or even more channels depending on the nature of the application. For example, the device to be remotely controlled might be a blasting charge, or an emergency device such as an oxygen supply, and in such events an even larger number of channels might be desired to insure maximum privacy.

A particularly attractive feature of the present invention is the interchangeability of channel sequencing thereby allowing for high orders of magnitude in the number of possible sequencing arrangements which can be employed. The predetermined order of channels in both the transmitter and the receiver can be changed or rearranged to obtain a new coding by simply changing or replacing one or more crystal oscillators in the desired channels in both the transmitter and the receiver. No changes in tone circuitry or other similar potentially complicating changes are required. Channels can also be added or eliminated with minimum complication.

Accordingly, an object of the present invention is to provide a novel and improved multichannel remote control system having a high degree of security and a high degree of reliability resulting from the use of standard and reliable components.

Another object of the present invention is to provide a novel and improved multichannel remote control system having a large number of available channels and wherein the selected channels which form the sequential code for operation of the device can be rearranged or changed as desired without requiring changes in any other circuitry.

Still another object of the present invention is to provide a novel and improved multichannel remote control system wherein the possibility of inadvertent channel actuation resulting from cross talk is eliminated, and wherein a high degree of protection is provided against intentional or unintentional unauthorized access to the device to be remotely controlled.

Other objects and advantages will be apparent and understood from the following detailed description and drawing.

BRIEF DESCRIPTION OF THE DRAWINGS

In the drawings, wherein like elements are numbered alike in the several figures.

DESCRIPTION OF THE PREFERRED EMBODIMENTS

Figure 1:
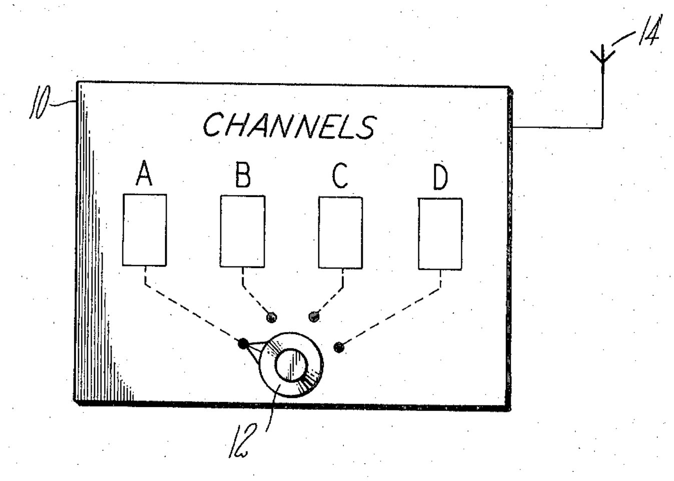
FIG. 1 is a representation of the transmitter for the remote control system of the present invention.

Referring now to FIG. 1, a representation is shown of a transmitter 10 for use in the present invention. The transmitter is a crystal controlled RF transmitter of the standard citizen band transmitter type. Four crystal controlled transmitter channels are shown, indicated as channels A, B, C and D. A selector switch 12 (which may, for example, be a single throw multipole or a push button type switch) selectively activates channels A, B, C and D to generate unmodulated carrier signals of desired frequencies which are transmitted by an antenna 14 in the order in which the channels are selected by switch 12. Although the transmitter and receiver will be described herein as a four channel system, it will, of course, be understood that the number of channels in a system can vary from a minimum of two to any desired maximum depending primarily on the degree of privacy desired for the system. Activation of switch 12 from channel A-D, inclusive, results in the generation of a series of unmodulated carrier signals of different frequencies as determined by the crystal in each of the transmitter channels A-D. The signal from each transmitter channel can, if desired, be of as short a duration as 0.5 to 1.0 seconds, although signals of longer duration can be used. However, the relatively short duration of 0.5 to 1.0 seconds is a sufficient period of time to allow for suitable noise filtering at the detector end of the system and provides for little or no interference with other channels using the same frequency for voice or signal transmission.

Figure 2:
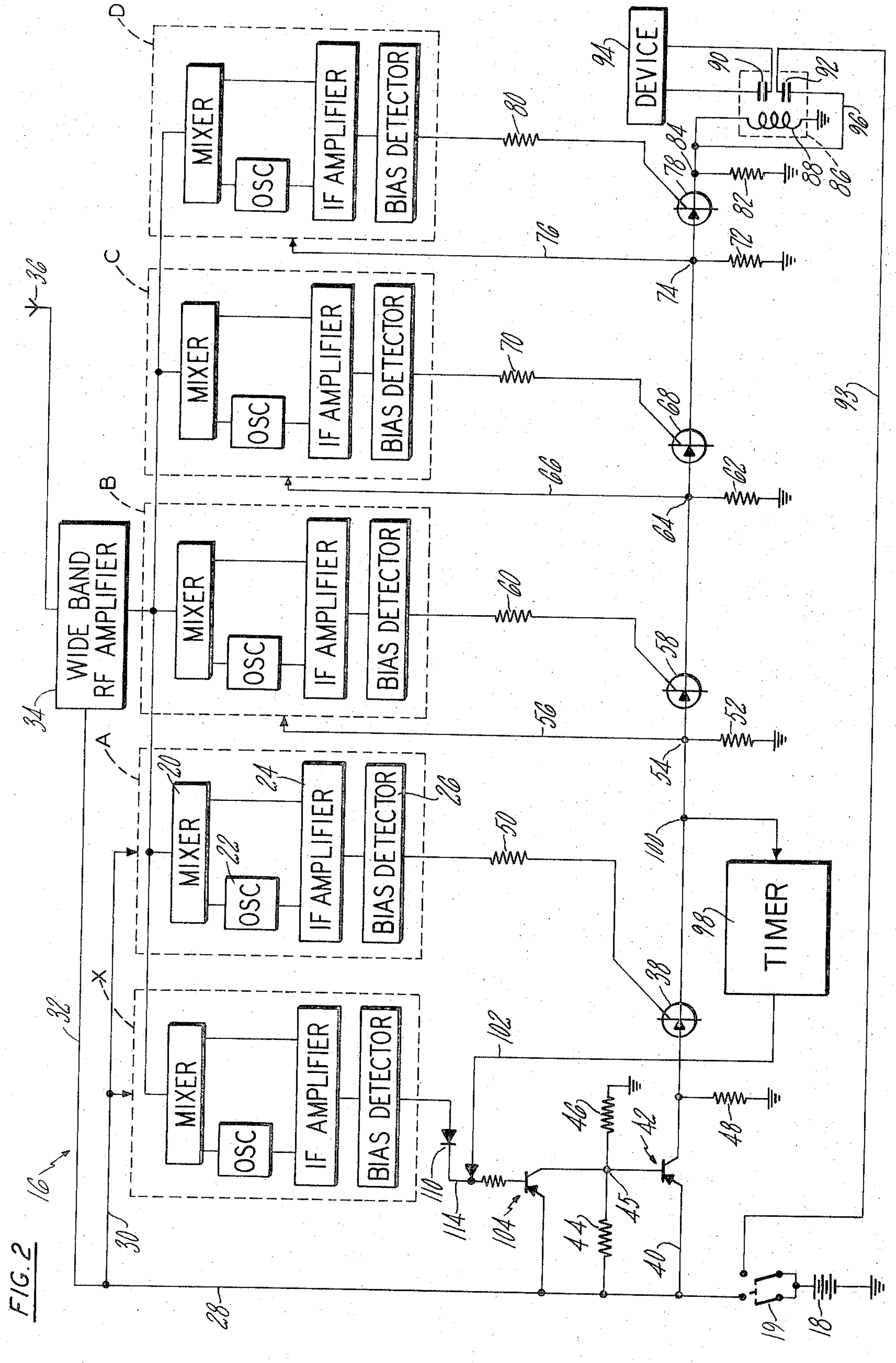
FIG. 2 is a schematic of the receiver of the remote control system of the present invention.

Referring to FIG. 2, a multichannel receiver is shown indicated generally at 16. Power is supplied to receiver 16 by a battery 18 which can be selectively connected or disconnected to receiver 16 by a single throw double pull switch 19. Although a battery source is shown as the power supply in FIG. 2, it will, of course, be understood that other sources such as a standard 110 volt a.c. supply with conversion equipment for conversion to the power utilization requirements of the receiver could also be employed. Switch 19 is shown in the off position in the solid line configuration in FIG. 2. When it is desired to operate receiver 16, switch 19 is moved to the dotted line position to connect receiver 16 to battery 18.

Receiver 16 has four channels, A, B, C and D corresponding, respectively to the channels A, B, C and D in transmitter 10. Each of the receiver channels has a mixer 20, a crystal oscillator 22 which is connected to the mixer to be beat against signals delivered to the mixer, an IF amplifier 24 which receives the output from mixer 20, and a bias detector 26 which functions to delay the generation of an output signal from the channel until a desired minimum voltage has been generated. Mixer 20, crystal oscillator 22, and IF amplifier 24 in each channel may be a standard citizen band receiver capable of detecting unmodulated carrier signals and each crystal oscillator 22 in receiver channels A, B, C, and D is frequency matched to the crystal in the respective transmitter channel.

The closing of switch 19 delivers power to channel A via conductors 28 and 30, and power is also delivered via conductors 28 and 32 to a wide band RF amplifier 34 which has a receiving antenna 36. It should be noted that although power is delivered to channel A upon the closing of switch 19, power is not delivered directly from switch 19 to channels B, C and D. Since channels B, C and D are not directly powered, the problem of cross talk between channels is eliminated.

The closing of switch 19 also results in a delivery of power to arm a silicon controlled rectifier 38 (SCR) which is connected to bias detector 26 to receive the output from receiver channel A. Power is delivered to SCR 38 via a conductor 40 and through normally conducting pnp transistor 42. Resistors 44 and 46 form a voltage divider in the base circuit of transistor 42 with the base being connected at junction 45 between the resistors. Since the emitter of transistor 42 is in line 40, a forward bias is developed across transistor 42 whereby transistor 42 is normally conducting when switch 20 is closed. A resistor 48 in the collector circuit of transistor 42 limits the current flow through transistor 42 and establishes a load or a voltage level which appears at the anode of SCR 38.

Assuming that transmitter 10 has been actuated so that the carrier frequency of transmitter channel A is being broadcast by antenna 14, that carrier signal is detected by receiver antenna 36 and is delivered to wide band RF amplifier 34. The output of amplifier 34 is connected in parallel to the mixer 20 of each of the receiver channels A, B, C and D. Since the crystal oscillator 22 of receiver channel A is matched to the frequency of the crystal oscillator in transmitter channel A, the output from amplifier 34 and oscillator 22 of receiver channel A are beat, in heterodyning fashion, in mixer 20 of receiver channel A whereby an output is generated in mixer 20 and is delivered to IF amplifier 24 of receiver channel A. The amplified output from that amplifier 24 is then delivered to bias detector 26 which functions as a noise immunizer and delay device to delay the output from channel A until a desired level of signal voltage is attained. To those ends, bias detector 26 has a noise filter and an adjustable pulse generator. Bias detector 26 thus functions to prevent a positive voltage from appearing at the output of channel A due to normal atmospheric or circuit noise, and it delivers a positive pulse to fire the associated SCR upon attainment of a desired output signal from the IF amplifier.

The positive voltage output at the output of bias detector 26 of channel A is delivered to a current limiting resistor 50 associated therewith so that an appropriate firing voltage is delivered to the gate of SCR 38 whereby SCR 38 is energized or fired and current flows therethrough.

Upon the firing of SCR 38, current flows through the circuit which includes resistor 52. Resistor 52 limits the output of SCR 38 to a level higher than the minimum holding current required by SCR 38, and thus a voltage occurs at junction 54, the voltage at junction 54 providing power to receiver channel B via conductor 56 and arming the anode of a second SCR 58.

It will be understood that each receiver channel has as part thereof or associated therewith a mixer, crystal oscillator, IF amplifier, bias detector, gate and SCR as described above with respect to channel A.

With power supplied to receiver channel B in the manner immediately discussed above, and bearing in mind that the crystal oscillator of receiver channel B is matched in frequency to the crystal controlled oscillator of transmitter channel B, receiver channel B is now in a state where an output can be generated from it if the proper frequency is received. The movement of transmitter switch 12 to activate transmitter channel B results in the generation and transmission of a second unmodulated carrier signal. Receipt of this second carrier signal by receiver antenna 36 results in an output from amplifier 34 which, when beat against the output of the crystal oscillator of receiver channel B, results in an output from the mixer of receiver channel B which is passed by the IF amplifier and the bias detector of receiver channel B in the same manner as previously described with respect to receiver channel A. The output from the bias detector of receiver channel B is delivered to a current limiting resistor 60 associated therewith in channel B whereby an appropriate firing input is delivered to the gate of SCR 58. SCR 58 is thus driven to a conducting state, and current flows in the circuit including resistor 62 whereby a voltage level is established at junction 64.

The appearance of the voltage signal at junction 64 results in the powering of receiver channel C via conductor 66 and also arms the anode of SCR 68 associated with receiver channel C. Receiver channel C is now in a state in which an output can be generated from that receiver channel in response to the transmission of an appropriate signal from transmitter 10. Again bearing in mind that the crystal oscillator of receiver channel C is matched in frequency to the crystal oscillator of transmitter channel C, the movement of transmitter switch 12 to activate transmitter channel C and transmit a third unmodulated carrier frequency results in an output from receiver channel C in the manner discussed above with respect to receiver channels A and B. The output of receiver channel C is delivered to a current limiting resistor 70 associated therewith whereby a firing input is delivered to SCR 68 so that current flows in the circuit which includes resistor 72. A voltage thus appears at junction 74 whereby power is delivered via conductor 76 to receiver channel D and an arming voltage appears at the anode of SCR 78 associated with receiver channel D.

Once again bearing in mind that the crystal oscillator of receiver channel D is matched with the crystal oscillator of transmitter channel D, movement of transmitter switch 12 to channel D results in the output of still another unmodulated carrier frequency which, in the manner discussed above with respect to receiver channels A, B and C, results in an output from receiver channel D. The output of receiver channel D is delivered to a current limiting resistor 80 associated therewith whereby a firing input is delivered to the gate of SCR 78 so that current flows and the circuit which includes resistor 82 and a voltage appears at junction 84.

A double contact relay 86 which has a solenoid 88 and normally open contacts 90 and 92, is connected to junction 84, and the appearance of a voltage level at junction 84 results in a current flow through solenoid 88 whereby normally open contacts 90 and 92 are closed. Contact 90 is in an electrical circuit which includes a device 94 which is to be remotely controlled. Device 94 may, as previously discussed, be any one of a number of devices such as lights, a garage door, an automobile ignition system, etc. A power supply is, of course, included in the circuit in which device 94 is located and that power supply may either be battery 18 or an independent power supply. The closing of normally open contact 90 results in the actuation of device 94, and thus it can be seen that the operation of device 94 is remotely controlled by the generation of a succession of unmodulated carrier signals at transmitter 10.

The four successive unmodulated carrier signals generated by transmitter 10 may be four different frequency signals. However, since only receiver channel A is initially powered and the succeeding channels B, C and D are not powered until the appropriate carrier signal has been received by the immediately preceding channel, it is also possible, if desired, to repeat a frequency signal one or more times. Accordingly, instead of four different unmodulated carrier signals, one or more of the transmitter channels could be the same as another transmitter channel; for example, transmitter channels B and D could generate the same unmodulated carrier signals, and receiver channels B and D could be matched to receive the same signals.

Contact 92 is connected via conductor 93 and switch 19 to the positive side of battery 18, and contact 92 is also connected via conductor 96 to solenoid 88, the connection of conductor 96 to solenoid 88 being between the solenoid and junction 84. Accordingly, even if the voltage signal at junction 84 is terminated after solenoid 88 has been initially energized, solenoid 88 will still be energized through the circuit including battery 18, switch 19, conductor 93, contact 92 and conductor 96 so that both contacts 92 and 90 will remain closed and remote control device 94 will continue to be operated as long as switch 19 is closed, notwithstanding the removal of the voltage at junction 84. This feature whereby the normally open relay 86 remains energized and in a closed state notwithstanding the removal of the initial activating signal is critical in the operation of the present invention because of a time control reset feature, to be discussed immediately below, which results in the discontinuance of the signal at junction 84 after the lapse of a predetermined period of time. The purpose of the incorporation of the timing device is two-fold; one, to avoid power drain from battery 18 in the event that the full number of necessary signals is not received in order to complete the channel sequence to activate device 94; and, two, to prevent unwanted actuation of the remote control device by spurious signals or other transmissions or atmospheric conditions after switch 19 has been closed.

The time control reset mechanism may include a monostable multivibrator 98, the input side of which is connected to junction 100 to receive the output from SCR 38. When SCR 38 conducts, an input signal is delivered to multivibrator 98 whereby a positive output pulse is generated by multivibrator 98 after a time delay, for example anywhere from 5 to 20 seconds, determined by the component values in the multivibrator. The positive output pulse is delivered via conductor 102 to the base of a transistor 104 which serves as a switch or gate in the time control reset mechanism for transistor 42. The emitter of transistor 104 is directly connected to conductor 28 and thus to battery 18 while the collector of transistor 104 is connected to the base of transistor 42 at junction 45. Transistor 104 is normally non-conductive. When the positive pulse from multivibrator 98 is delivered to the base of transistor 104, a forward bias is developed to cause transistor 104 to conduct. Since the collector of transistor 104 is connected to junction 45 in the base of transistor 42, a potential is imposed on the base of transistor 42. The potential thus applied at the base of transistor 42 is such that this normally conducting transistor 42 is turned off. Accordingly, the power input to the anode of SCR 38 is terminated after a period of time determined by the time constant of multivibrator 98, and thus the sequence of delivering power to successive receiver channels is terminated. The termination of the output pulse from multivibrator 98 removes the potential applied to the base of transistor 104 to render transistor 104 non-conducting. Thus, the potential at junction 45 at the base of transistor 42 imposed by the collector circuit of transistor 104 is removed whereby the normally conducting state of transistor 42 is reestablished. The arming voltage is thus reestablished at the anode of SCR 38, and receiver 16 is in a condition to again receive activating signals.

The time control mechanism described immediately above is a form of a safety interlock in the system, and a second form of safety interlock is also incorporated to protect against activation of the system by random signals which may either be intentional or unintentional. This second safety interlock is in the form of an additional receiver channel indicated as channel X. Receiver channel X is directly powered from battery 18 via lines 28 and 30 and is identical to channels A, B, C and D, with the exception that the frequency of the oscillator of channel X is selected at random and is different from the frequencies of the oscillators in any of the other receiver channels. In the event a signal is received corresponding to the frequency of the oscillator of channel X (a signal which may either be unintentionally generated or intentionally generated in an attempt to activate the system by generating a series of different frequency signals) the output will be generated from channel X which will be applied through diode 112 and conductor 114 to the base of transistor 104. This positive potential thus applied the base of transistor 104 will turn off transistor 42 (in the same manner as is caused by an output pulse from multivibrator 98) and thus terminate operation of the receiver. This interlock accomplished by channel X thus protects the privacy of the system by preventing actuation of the remote control device 94 by spurious, unintentional, or intentionally improper signals. Upon termination of the signal which activated channel X, the output from channel X to the base of transistor 104 is removed, and transistor 42 resumes its normally conductive state so that the receiver is again ready for proper operation.

Figure 3:
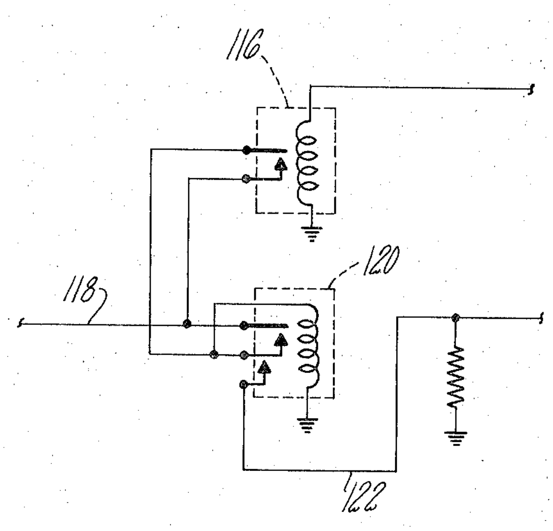
FIG. 3 is a schematic representation of an alternate configuration for a detail of a receiver of FIG. 2.

Referring now to FIG. 3 an alternate arrangement is shown whereby the SCRs 38, 58, 68 and 88 may be replaced with relays. To that end, the bias detector 26 of a receiver channel would be connected to the solenoid of a normally opened relay 116 and the generation of an output from the receiver channel would cause the contact of the relay to close. Upon the closing of the contact of relay 116, the potential on line 118 (which would be at the output of transistor 42 if the first stage is involved or from the preceding relay configuration if any successive channel is involved) is applied to the solenoid of a normally opened double contact relay 120 to close both of the contacts of relay 120. Upon the closing of the two contacts of relay 120, current flows in conductor 122 whereby a potential is developed for delivery to the next succeeding relay loop in the next succeeding channel. Also, a current flow is developed directly from line 118 through the solenoid of relay 120 to keep relay 120 closed after the cessation of the output from the channel to which relay 116 is connected.

As can readily be seen from the foregoing description, the present invention discloses a multichannel remote control system which is economical to build, possesses a high degree of security, is immune to noise, does not require tone control or tone circuitry (since only carrier signals are used for operation) and has a high degree of flexibility for the number of possible channels and for interchange of channel codes.

What is claimed is:

1. A multichannel remote control system having a transmitter which generates a plurality of carrier signals of selected frequencies in predetermined order for transmission, said system including:

receiver means having a plurality of receiver channels, each of said receiver channels being responsive to a predetermined carrier frequency to generate an output signal upon receipt of a carrier signal of predetermined frequency;

conductor means connecting said receiver channels in an array for sequentially receiving said carrier signals;

a conduction control means associated with each receiver channel, each conduction control means having an input circuit an an output circuit and also being connected to receive a control signal from its associated receiver channel, each of said conduction control means being normally non-conductive and being rendered conductive upon receipt of a control signal from its associated receiver channel;

switch means for selectively connecting a power source to the first channel in said array of receiver channels and to the input circuit of said conduction control means associated with said first channel;

said conductor means being in the output circuit of each of said conduction control means, the output circuit of each conduction control means other than the conduction control means associated with the last receiver channel in the array being connected to the next succeeding receiver channel and to the conduction control means associated with that next succeeding receiver channel for powering said next succeeding receiver channel and arming said associated conduction control means, and the output circuit of the conduction control means associated with the last receiver channel being connected to actuating means for a device to be remotely controlled; and time control reset means for terminating the delivery of power to said receiver channels upon the expiration of a predetermined period of time after receipt of a signal by said receiver.

2. A multichannel remote control system as in claim 1 wherein:

said time control reset means is connected to receive an output signal from the conduction control means associated with the first receiver channel and generate a signal to disconnect the conduction control means associated with the first receiver channel from said power source; and further including safety interlock means for terminating the sequential delivery of power to said receiver channels upon the receipt of a random carrier signal.

3. A multichannel remote control device as in claim 1 wherein:

said switch means includes normally conducting first electronic switch means between said power source and said conduction control means associated with said first receiver channel, said time control reset means being connected to render said first switch means non-conducting.

4. A multichannel remote control device as in claim 2 wherein:

said safety interlock means includes a random frequency receiver channel, said random frequency receiver channel being connected to render said first switch means non-conducting.

5. A multichannel remote control system as in claim 4 wherein said time control reset means includes:

a normally non-conductive second electronic switch means and a timer;

said normally non-conducting second electronic switch means being connected to said normally conducting first switch means, and to said timer and said safety interlock, said normally non-conducting second switch means being rendered conductive upon receipt of a signal from either said timer or said safety interlock and delivering a signal to render said normally conducting first switch means non-conducting.

6. A multichannel remote control system as in claim 1 wherein:

said transmitting means includes a plurality of crystal oscillators for generating said carrier signals; and each of said receiver channels has a crystal oscillator matched to a crystal oscillator in said transmitter.

7. A multichannel remote control system as in claim 1 including:

means responsive to generation of a signal in the output circuit of the conduction control means associated with the last receiver channel in the array for connecting said power source to the actuating means in the output circuit of said conduction control means.

8. A multichannel remote control system as in claim 7 wherein:

said means responsive to the generation of a signal in the output circuit of the conduction control means associated with the last receiver channel includes a double contact relay, said double contact relay having a solenoid in the output circuit of the conduction control means, a first normally open contact in a circuit connected to the device to be controlled, and a second normally open contact; and including conductor means connected between said power source and a point in the output circuit of said conduction control means before said solenoid, said second contact being in said conductor means.

9. A multichannel remote control system as in claim 1 wherein:

said conduction control means is a solid state device.

10. A multichannel remote control system as in claim 9 wherein:

said conduction control means is a silicon controlled rectifier.

11. A multichannel remote control system as in claim 1 wherein:

said conduction control means is a relay device.

12. A multichannel remote control system as in claim 2 wherein:

said safety interlock is connected to said power source upon connection of said first channel to said power source.

13. In a multichannel remote control system for receiving carrier signals in a predetermined sequence:

receiver means having a plurality of receiver channels, each of said receiver channels being responsive to a predetermined carrier frequency to generate an output signal upon receipt of a carrier signal of predetermined frequency;

conductor means connecting said receiver channels in an array for sequentially receiving carrier signals;

a conduction control means associated with each receiver channel, each conduction control means having an input circuit and an output circuit and also being connected to receive a control signal from its associated receiver channel, each of said conduction control means being normally non-conductive and being rendered conductive upon receipt of a control signal from its associated receiver channel;

switch means for selectively connecting a power source to the first channel in said array of receiver channels and to the input circuit of said conduction control means associated with said first channel;

said conductor means being in the output circuit of each of said conduction control means, the output circuit of each conduction control means other than the conduction control means associated with the last receiver channel in the array being connected to the next succeeding receiver channel and to the conduction control means associated with the next succeeding receiver channel for powering said next succeeding receiver channel and arming said associated conduction control means, and the output circuit of the conduction control means associated with the last receiver channel being connected to actuating means for a device to be remotely controlled; and time control reset means for terminating the delivery of power to said receiver channels upon the expiration of a predetermined period of time after receipt of a signal by said receiver.

14. A multichannel remote control system as in claim 13 wherein:

said time control reset means is connected to receive an output signal from the conduction control means associated with the first receiver channel and generate a signal to disconnect the conduction control means associated with the first receiver channel from said power source; and further including safety interlock means for terminating the sequential delivery of power to said receiver channels upon the receipt of a random carrier signal.

15. A multichannel remote control device as in claim 13 wherein:

said switch means includes normally conducting first electronic switch means between said power source and said conduction control means associated with said first receiver channel, said time control reset means being connected to render said switch means non-conducting.

16. A multichannel remote control device as in claim 14 wherein:

said safety interlock means includes a random frequency receiver channel, said random frequency receiver channel being connected to render said first switch means non-conducting.

17. A multichannel remote control system as in claim 15 wherein said time control reset means includes:

a normally non-conductive second electronic switch means and a timer;

said normally non-conducting second electronic switch means being connected to said normally conducting first switch means, and to said timer and said safety interlock, said normally non-conducting second switch means being rendered conductive upon receipt of a signal from either said timer or said safety interlock and delivering a signal to render said normally conducting first switch means non-conducting.

18. A multichannel remote control system as in claim 13 including:

means responsive to generation of a signal in the output circuit of the conduction control means associated with the last receiver channel in the array for connecting said power source to the actuating means in the output circuit of said conduction control means.

19. A multichannel remote control system as in claim 18 wherein:

said means responsive to the generation of a signal in the output circuit of the conduction control means associated with the last receiver channel includes a double contact relay, said double contact relay having a solenoid in the output circuit of the conduction control means, a first normally open contact in a circuit connected to the device to be controlled, and a second normally open contact; and including conductor means connected between said power source and a point in the output circuit of said conduction control means before said solenoid, said second contact being in said conductor means.

20. A multichannel remote control system as in claim 13 wherein:

said conduction control means is a solid state device.

21. A multichannel remote control system as in claim 20 wherein:

said conduction control means is a silicon controlled rectifier.

22. A multichannel remote control system as in claim 13 wherein:

said conduction control means is a relay device.

23. A multichannel remote control system as in claim 14 wherein:

said safety interlock is connected to said power source upon connection of said first channel to said power source.

* * * * *